United States Patent [19]

Leiber

[11] 3,767,272
[45] Oct. 23, 1973

[54] HYDRAULIC BRAKE SYSTEM WITH ANTI-LOCKING CONTROL
[75] Inventor: Heinz Leiber, Leimen, Germany
[73] Assignee: Teldix GmbH, Heidelberg, Germany
[22] Filed: Sept. 23, 1971
[21] Appl. No.: 183,028

[30] Foreign Application Priority Data
Sept. 23, 1970 Germany.................. P 20 46 802.4
Apr. 22, 1971 Germany.................. P 21 19 606.5

[52] U.S. Cl............. 303/21 AF, 137/486, 188/1 A, 200/81.9 M, 303/84 A, 340/52 C
[51] Int. Cl............................................. B60t 8/12
[58] Field of Search.................... 60/54.5 E; 137/2, 137/486, 487.5; 188/1 A; 200/81.9 M, 82 E; 303/1, 21, 61, 84 A; 340/52 C, 60

[56] References Cited
UNITED STATES PATENTS

| 3,231,315 | 1/1966 | Turnbull................................. 303/61 |
| 3,495,880 | 2/1970 | Gratsch............................. 303/61 X |
| 3,658,388 | 4/1972 | Hasegawa................... 303/21 A X |
| 3,671,082 | 6/1972 | Stevens............................... 303/21 P |
| 3,639,009 | 1/1972 | Klein et al......................... 303/21 F |
| 3,416,560 | 12/1968 | Bruno..................... 137/487.5 X |
| 3,194,608 | 7/1965 | Rich................................... 303/1 X |
| 2,963,563 | 12/1960 | Patterson.................... 200/81.9 M |
| 2,674,095 | 4/1954 | Kirk................................. 60/54.5 E |
| 2,451,828 | 10/1948 | Herriott........................... 303/84 A |

FOREIGN PATENTS OR APPLICATIONS

| 858,639 | 12/1952 | Germany....................... 303/84 A |
| 849,890 | 12/1939 | France............................ 303/84 A |

Primary Examiner—Milton Buchler
Assistant Examiner—Stephen G. Kunin
Attorney—George H. Spencer et al.

[57] ABSTRACT

An improved hydraulic brake system of the type including an anti-locking control for preventing the locking of a wheel or wheels during a braking action, and shutoff valves in the lines which connect the pressure source, i.e., the master cylinder, to the wheel brake cylinders. At least one volume monitor, (leak detector) is provided for determining the volume of the pressure medium flowing from the pressure source to the respective wheel brake cylinder and for emitting an electrical signal, which is used to close the associated shut off valve, whenever a certain threshold volume has been exceeded indicating a leak in the associated brake line. Various specific arrangements for the volume monitor control, both in single circuit and dual circuit brake systems and a preferred arrangement for the brake circuit distribution for a front wheel drive automobile are disclosed.

30 Claims, 8 Drawing Figures

HYDRAULIC BRAKE SYSTEM WITH ANTI-LOCKING CONTROL

BACKGROUND OF THE INVENTION

The present invention relates to a hydraulic brake system for vehicles having an anti-locking control arrangement in which check valves which are controlled by the anti-locking controller are connected in those brake lines which connect the pressure source with the wheel brake cylinders. The invention relates quite generally to the problem of increasing the operation dependability of such hydraulic brake systems in that apparatus is provided which prevents a malfunction of the complete system when a brake line breaks or leaks due to stones hitting it or due to corrosion.

The prevention of the malfunctioning of the entire brake system upon the occurrence of a leak in one of the brake lines has been accomplished with the known and widespread two circuit brakes. In such systems according to the prior art, however, it has been found that when the circuit feeding the front brakes malfunctions, only about 30 percent of the braking effect remains. Experience has shown that the brake of the front wheel of a four-wheel vehicle produces 35 percent of the braking effect while the brake of a rear wheel produces only 15 percent.

A further drawback of the known two-circuit brake is that when one brake circuit malfunctions its total main cylinder volume is lost and thus a relatively long pedal movement is required which can also be called "falling down" of the brake pedal. This phenomenon has been found to have extremely unfavorable psychological effects on the driver who is surprised by it and then becomes frightened.

Increased residual braking action at the malfunction of one brake circuit is produced with the also known so-called duo-two circuit brakes. This is understood to mean a brake system for a four-wheeled vehicle whose front wheel brakes are each provided with two separately fed brake cylinders. One brake cylinder of each of the front wheels and the brake cylinder of one rear wheel are connected together to one brake circuit. In this case, when one brake circuit fails, each front wheel still retains one-half the brake action which, together with the braking action of the remaining rear wheel, results in a residual braking effect of 50 percent. This solution, however, is very expensive.

SUMMARY OF THE INVENTION

It is therefore the object of the present invention to provide a brake system which retains a residual braking effect which is as high as possible when one brake line starts leaking. This brake system must be as simple as possible under consideration of the expenditures required for the anti-locking controller.

To solve this problem it is proposed to provide at least one volume control which monitors the volume of the pressure medium flowing from the pressure source to the wheel brake cylinders and which emits an electrical signal when a predetermined threshold volume has been exceeded which signal causes a shutoff valve, e.g. the inlet valve, connected in the path of the leak to be closed with priority and block the effected brake line. The electrical signal according to the present invention is used first of all to block the line but can also additionally serve to initiate a warning signal.

When considering this solution, the fact that about 80 percent of all brake malfunctions have their origin in leaks in the area of the brake hoses and the brake cylinder itself must be considered. If then, as provided by the present invention, the shutoff valves, are centrally disposed, e.g. adjacent to or as part of the master cylinder, they are able to effectively protect the portion of the hydraulic line system which is subject to the most danger. In the most unfavorable case — assuming the front wheels are separately controlled and a volume control is in each line — one front wheel brake may fail in the system according to the present invention when there is a leak in the brake line leading to this front wheel, and the system will still provide a residual braking effect of 65 percent of the full braking effect.

The proposed solution is particularly suited for vehicles whose front wheels have a suspension of the type where king pin offset is zero or negative (See German Patent No. 1,077,538). With such a construction the pivot axis of the front wheels intersects the roadway for example outside of the standing surface with the result that with irregularly pulling brakes and, in the extreme case, when only one front wheel is being braked, the vehicle will continue in a forward direction of travel and no interfering moment acts on the steering wheel.

A further advantage of the present invention is that the loss of volume, when there is a defect in the line, is greatly limited and that the noticeable pedal movement is only slight.

The volume control according to the present invention may be a cylinder which is connected in a brake line and is divided into two chambers of a movable piston. One of the two chambers is connected with the outlet of the shutoff valve, while the other chamber is connected with the line which preferably leads to a wheel brake cylinder. The piston follows the displacement of the brake fluid column during braking and actuates an electrical contact when ever it reaches a certain switching position which occurs, however, only in the case of a leak in the brake line.

Instead of the above-described configuration, the volume control or the leak sensor as it could also be called, may also comprise two or a plurality of cooperating cylinders which are connected into the different brake lines and which are also each divided into two chambers by a piston. One of these two chambers of each cylinder is connected with the outlet of the corresponding shutoff valve and the other chamber of each cylinder is connected with the brake line to the corresponding wheel cylinder. With this construction means are provided for comparing the position of the two or more pistons, and the blocking signal is produced only when a certain difference in positions between at least two pistons has been reached. The blocking signal is then used to actuate the shutoff valve associated with the leading piston, i.e., the piston which has travelled the greater distance. This construction has the advantage than even small leaks can be more easily recognized. The measurement performed here is thus a relative measurement. The position of the two pistons, may be determined, for example, by resistances which change with the position of the pistons, a certain voltage ratio at these resistances actuating the signal.

If the brake pressure is regulated by means of the blocking control so that the brake fluid is blocked off and a portion of the fluid is permitted to escape between the shutoff valve and the wheel brake cylinder into a return line, it may happen, when the control pressure being applied at the different wheels is not the same, e.g. when only a single wheel is in a locking condition, that a difference in position of the respective pistons of the volume control is produced by the anti-locking brake control system which would cause the volume control to be actuated. According to a further feature of the present invention this type of false indication is avoided in such a case by ensuring that the blocking signal from the leak sensor is effective to cause a blocking of the associated brake line only during an uncontrolled braking action. The occurrence of a control signal thus prevents the blocking signal from the volume monitor or leak sensor from becoming effective during the controlled braking action. With single wheel control it is most favorable in this embodiment to compare the position of the pistons which are associated with wheels on different axles.

Other features of the present invention will become evident from the following. At the beginning of the braking action the piston of the volume monitor or leak sensor must always take up the same starting position. In order to achieve this result, the piston is normally held in the starting position by a resetting spring, and the chambers on both sides of the piston are connected together by means of a channel extending in a longitudinal direction through the piston, which channel contains a fine nozzle. To ensure that this arrangement does not hinder the required rapid pressure reduction during release of the brake after the braking action takes longer, a further channel is provided through the piston which further channel contains a check valve which opens from the wheel brake cylinder toward the shutoff valve.

It is known that the brakes are bled in the repair shops by means of pumping the brake pedal which presses a relatively large quantity of fluid rapidly through the lines. This bleeding process must also not be interfered with by the leak sensor of the present invention. It is therefore further proposed to enable the piston to move into an end position beyond the switching position, where the piston is bypassed by a longitudinal channel with a sufficiently large cross section formed along the inner wall of the cylinder.

With regard to the switching device which is actuated by the piston of the leak sensor, high dependability is a prime requisite. Therefore, according to a further feature of the invention, the piston contains a permanent magnet or is magnetized and a gas protected electrical contact which is sensitive to a magnetic field, or a semiconductor which is sensitive to a magnetic field, is disposed adjacent the cylinder in such a manner that it is actuated by the magnetic field of the piston when the latter is in the switching position. The above-mentioned gas protected contacts are widely used today and are called "reed contacts". In addition to their extremely small dimensions, such reed contacts have the advantage that they will not oxidize over long periods of time. The same applies for the magnetic field dependent semiconductor. It is also advisable to feed the electric signal produced by the volume monitor or leak sensor to an electric memory which operates any desired type of warning device even after the signal ceases; at least until the current supply is switched off in that the ignition is cut off.

The present invention can be used for vehicles with single circuit brake systems if the wheels or at least the front wheels are controlled individually. It is, however, the particular intent of the present invention that it be applied to vehicles having dual circuit brake systems.

In dual circuit brake systems in which a dual circuit main cylinder is employed whose two pistons are actuated by means of a swingletree, a volume monitor can be obtained by the application of two switch contacts, one of which is actuated by a certain twist of the swingletree into a certain direction. The switching signals thus produced are utilized to close all of the associated shutoff valves. The volume is monitored in this embodiment in that the displacement of the swingletree is utilized, which displacement occurs to a degree sufficient to make contact only when a leak is present in one of the circuits.

The volume monitor operating in the above-described manner permits only the switching off of an entire brake circuit. This prevents the brake pedal from having a very large fall-down. The correct shutoff valve in whose line the leak is present can be detected, according to a further feature of the present invention, by means of an electronic switching arrangement which closes one shutoff valve after another upon the occurrence of the switching signal from the volume monitor and then determining whether an increase in volume occurs after closing of the respective valve. This increase in volume can be sensed by further contacts which respond to a further increase in volume. If, for example, two shutoff valves are provided, closing of the first contact causes the first valve to be closed. If an increase in volume still occurs, the second contact also closes so that the second valve, in whose line the leak must of necessity be, is caused to be closed. The shutoff valve in whose line the leak is then remains closed.

It should also be mentioned that with the above-described solution the blocking signal from the volume monitor must become effective only — when the control is effected by permitting brake fluid to flow out — when an uncontrolled braking action is taking place.

According to a further feature of the present invention the volume monitor controlling the shutoff valve is used in a dual circuit brake system whose one brake circuit influences only the brake of one front wheel and whose other brake circuit influences the remaining wheels, i.e. at least one volume monitor is provided for controlling the shutoff valve. Preferably this volume monitor is disposed in the pressure medium line which leads to the front wheel disposed in the same brake circuit with the rear wheels. With separate control of the brake pressure at the rear wheels, a volume monitor or leak sensor may also be connected in one of these pressure medium lines or in both of them. When the pressure is jointly controlled at the rear wheel brakes, one volume monitor or leak sensor in the common line is sufficient.

If a valve combination consisting of a normally open inlet valve and a normally closed outlet valve are used for controlling the pressure medium channel, in order to let the pressure medium flow out from between the wheel brake cylinder and the inlet valve so as to reduce the pressure, the inlet valve is controlled with priority by the volume monitor or leak sensor. With priority in this case means that as long as the leak sensor furnishes a shutoff signal, the shutoff valve must not be opened by a control signal. When a three-way valve serves as the control valve, it is controlled by the leak sensor. For a regulation with such valves it may also be advisable, when a separate leak sensor is provided in each line (absolute volume measurement), to have the leak sensor signal be effective only during an uncontrolled brake action, i.e. when the anti-locking control system has not been actuated.

The advantages of the above-described brake circuit distribution with only the brake of one front wheel in one brake circuit and the brakes of the other wheels in the other brake circuit become clear when the following is considered.

When designing dual circuit brake systems it is generally desired to arrive at such a distribution of the brake circuits that the braking effect remains as high as possible when one of the circuits malfunctions. To meet this requirement, different brake circuit distributions have been tested or contemplated. Thus it is known (1) to include the brake of one of the axles in each brake circuit, (2) to cause the brakes of the front axle to be influenced by both circuits and to include the brakes of the rear axle in one of the circuits, (3) to again have the brakes of the front axle influenced by both circuits and to include the brake of one rear wheel in one circuit. It is also known, (4) to include one front wheel and the diagonally opposite rear wheel in one brake circuit and (5) it has been considered to place the brakes on one side of the vehicle in one brake circuit.

Unsymmetrical distributions of the brake circuits are known to be possible when the king pin offset is zero or negative since unilaterally acting braking moments then cannot have any adverse effects (see in this connection the above-cited Patentschrift No. 1,077,538).

The decisive factor for the distribution of the brake circuits is the axle load distribution. For a rear wheel drive, the brakes are generally so dimensioned that the brakes of the rear wheels contribute about 30 percent of the braking deceleration. For a front wheel drive the conditions are such however, that in the most unfavorable case (i.e. strong deceleration of the vehicle at no load) the brakes of the rear wheels contribute only about 20 percent to the braking deceleration. A solution according to the brake circuit distribution mentioned under (1) above thus has the drawback that the remaining braking action is very low when the front wheel brake circuit malfunctions. The brake circuit distributions mentioned under (2) and (3) above are expensive due to the required double influencing of the brakes at the front axle and are also of doubtful value due to the thermal stresses on the front axle brakes. For this reason solutions (4) and (5) were developed.

In the solutions marked (4) and (5) above 50 percent of the braking action remains when one of the brake circuits malfunctions. In contradistinction thereto, when the preferred distribution according to the present invention is employed and a leak sensor is used in the brake channel leading to the front wheel which is included in a brake circuit with the rear wheels, and with separately controlled rear wheel brakes by two additional leak sensors in those channels, or with the rear wheel brakes being controlled together by one additional leak sensor in this channel (in dependence on whether the rear wheels contribute 20 or 30 percent of the braking action), the residual braking action in the most unfavorable case upon the occurrence of a leak is at least 60 or 65 percent. Even when the same number of leak sensors are employed, this high residual braking action is not assured for the solutions marked (4) and (5) above.

The following also speaks for the preferred distribution according to the present invention.

For vehicles where the rear axle brakes contribute only slightly to the braking deceleration, i.e. particularly vehicles with front wheel drive which are being used more and more in compact and medium size cars, an anti-locking control system is desired which for price considerations must not be as expensive as for large automobiles, where these days each one of the four wheels is controlled entirely separately, but must still show a good effect. There is the tendency for such automobiles to use only three control channels instead of the four control channels, i.e. to save a channel. Control systems are known in which the brakes of the rear axles are controlled together, a reduction in the braking pressure being initiated when either both rear wheels show a tendency to lock (select high) or when at least one of the rear wheels produces a corresponding signal (select low). The latter type of control can be used when the braking contribution of the rear wheels is very low since then the braking action of the rear wheels, which is not optimum in every case, cannot have such a strong effect. A non-optimum braking action is realized in the case of unequal friction coefficients between tires and road or in the brake. With a combined control of the rear wheel brakes, the brake circuit distributions marked (4) and (5) cannot be used, but the distribution according to the present invention is possible.

With the unsymmetrical distribution of the brake circuits according to the present invention it is also necessary to make the king pin offset zero or negative.

The signals for the above-mentioned combined control of the rear wheel brakes which will be used particularly for front wheel drive vehicles will preferably be produced with the aid of acceleration and/or wheel rotation speed signals.

The control of the rear wheels can be effected according to the rotational speed of the slower rotating wheel (select low) or according to the rotational speed of the faster rotating wheel (select high) or according to the rotational speed obtained from taking an average. Most favorably, the control is normally effected (when braking during a straight-ahead drive) according to the rotational speed or deceleration of the faster rotating wheel and, upon the occurrence of a given transverse acceleration of the vehicle, according to the rotational speed or deceleration of the slower rotating wheel. This type of control has the effect that one wheel may lock during braking in a straight-ahead drive and the other wheel has optimum braking characteristics because of the control. Thus in this configuration the rear wheels would produce approximately the maximum possible braking action. When a transverse acceleration occurs which is greater than a given value, i.e. when driving through a curve, such a control, which might cause a wheel to lock, must not be used because of the reduced lateral stability. That is the reason why in this state the control is switched to select low.

Advisably a guide or reference value is formed from the rotational speeds of the rear wheels, and if required of those of the front wheels, which is utilized to control the front wheels.

BRIEF DESCRIPTION OF THE DRAWINGS

FIG. 4b illustrates a modification of the embodiment of FIG. 4a.

DESCRIPTION OF THE PREFERRED EMBODIMENTS

Figure 1:
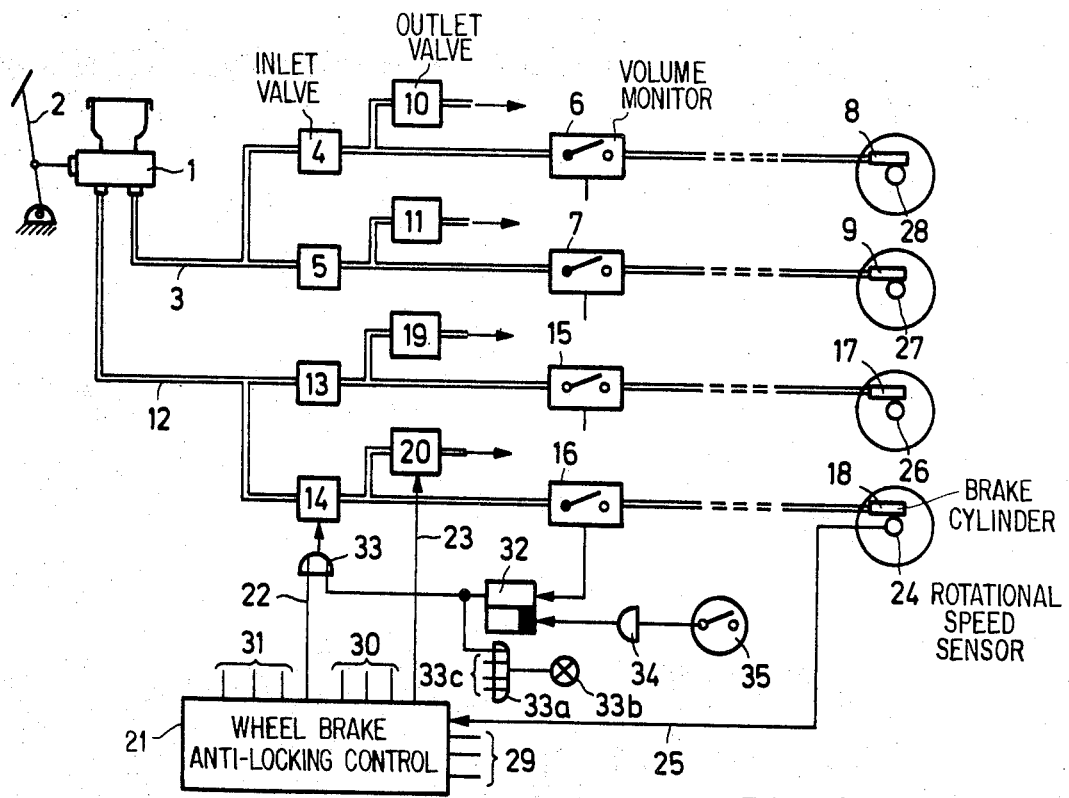
FIG. 1 is a simplified hydraulic electric circuit diagram of a brake system with a volume monitor control according to the present invention.

Referring now to FIG. 1 there is shown a tandem main or master brake cylinder 1 whose piston is actuated by a brake pedal 2. The main pressure line 3 of the one brake circuit branches off and leads to two inlet valves 4 and 5 which are respectively connected with the wheel brake cylinders 8 and 9 via two volume monitors or leak sensors 6 and 7. To the respective connecting lines between the inlet valves 4, 5 and the leak sensors 6, 7, branch lines are provided which are normally closed by outlet valves 10 and 11. The pressure medium escaping via these outlet valves during a reduction in pressure caused by actuation of the anti-locking controller is returned, depending on the selected embodiment of the brake control system, to the reservoir (not shown) or into the respective main brake line by means of a pump (not shown). The main brake line 12 of the second brake circuit leads correspondingly to two inlet valves 13 and 14 and via leak sensors 15 and 16 to the wheel brake cylinders 17 and 18 respectively of the rear wheels. The outlet valves for the rear brake cylinders 17 and 18 are here marked 19 and 20 respectively.

All of the inlet and outlet valves are controlled by an electronic anti-locking controller 21 in a manner known in the art. The signals from the controller 21 flow to the inlet valve 14 via a line 22 and to the outlet valve 20 via a line 23. The controller 21 receives signals about the rotational behavior of the braked wheel from a sensor 24 at the left rear wheel via a line 26. Similarly, wheel sensors 26 to 28 are connected to the controller at 29, while controller outputs 30 and 31 lead to the remaining outlet and inlet valves respectively. The connection of the leak sensors according to the present invention is also shown only for the example of leak sensor 16. The output signal of leak sensor 16 is fed to the one input of a memory 32 which may, for example, be a flip-flop. A short signal enables the memory in such a manner that a signal appears at its output which closes the inlet valve 14 via an OR gate 33. Simultaneously a warning device 33b is actuated via a further OR gate 33a. When the ignition switch 35 is switched off, a signal reaches the second input of the memory via an inverter 34 so that the memory is returned to its rest state. Corresponding memories are connected to the remaining leak sensors 6, 7 and 15, whose outputs control the respective inlet valves 4, 5 and 13 respectively and are likewise connected to the OR gate 33a at 33c.

In the illustration, consideration is given to the fact that the inlet and outlet valves and the leak sensors can be combined into a structural unit or at least be accommodated in the motor housing as closely together in space as possible. The lines from the leak sensors to the wheel brake cylinders are therefore relatively long which is shown in the drawing by a dashed interruption. These line portions are blocked by the associated inlet valve when they themselves or the associated wheel brake cylinder experience a leak.

Figure 2:
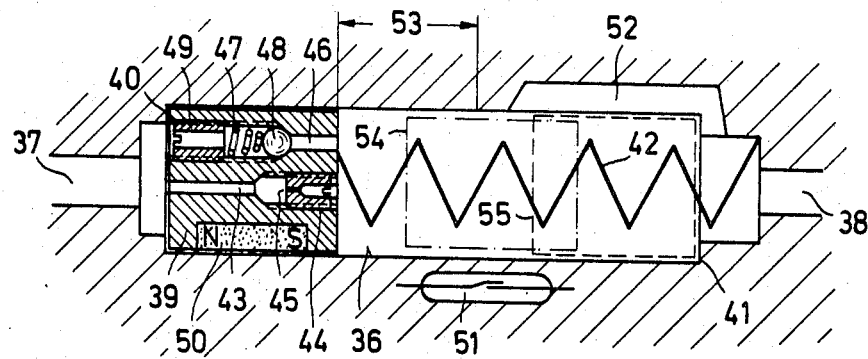
FIG. 2 is a longitudinal section through one embodiment of a volume monitor or leak detector.

FIG. 2 shows the configuration of the leak sensors of FIG. 1 in detail. The leak sensor basically comprises a cylinder 36 having two connections, one at each of the frontal faces, with the connection 37 being connected with the outlet of one of the inlet valves and connection 38 being connected with one of the wheel brake cylinders. A piston 39 moves in the cylinder between abutments 40 and 41. The piston 39 is normally held in the illustrated position against the abutment 40 by means of a spring 42.

In order to permit the piston 39 to return to the illustrated starting position during permanent changes in volume, e.g. after bleeding of the brakes, the piston 39 is penetrated by a longitudinal channel 43, into which is threaded a screw 44 having a fine nozzle 45. The piston 39 is also provided with a second longitudinal channel 46 containing a check valve consisting of a ball 48 which is normally pressed on its seat by a spring 47. The spring is supported by a screw 49 containing a bore. The check valve opens the passage for the pressure medium when the brake is released.

In order to provide the electrical signal indicating the presence of a leak, the piston 39 also contains a rod-shaped permanent magnet 50 which cooperates with a gas protected contact 51 which is sensitive to a magnetic field, e.g. a reed contact. The gas protected contact 51 is preferably inserted into the wall of cylinder 36 or is at least disposed in the vicinity of the wall.

In operation, during the pressure build-up phase of the braking sequence, braking medium is moved from the main pressure cylinder 1 to the wheel brake cylinder. Corresponding to the moved volume, piston 39 also moves within cylinder 36. The moved volume is known and limited by the maximum operating pressure of the brake and the elastic deformation of the structural components occurring thereby. With a normally bled brake a slight deviation of this volume is known.

According to these conditions, the piston 39 thus moves in the region of stroke 53 during normal operation of the brake. If the braking action lasts for a longer period of time, the piston is returned, possibly to its starting position, due to its spring 42 and nozzle 45. If the pressure in the main brake line falls after the braking action is completed, the pressure in the wheel brake cylinder releases via the check valve so that ball 48 is lifted off its seat. If, however, a leak occurs in the line connected at 38 during the pressure build-up phase, piston 39 moves beyond the above-mentioned maximum stroke 53 into position 54. This is the switching position in which the magnetic field of magnet 50 brings the gas protected contacts 51 together to produce the desired electrical signal. The thus produced signal then causes the appropriate inlet valve to be closed immediately and the warning device to be actuated.

During bleeding of the brake system, piston 39 will move up to its end position 55 in which the pressure medium finds a free path through channel 52 around the piston 39. Thus larger volumes can be pumped through the line without any problems.

Figure 3:
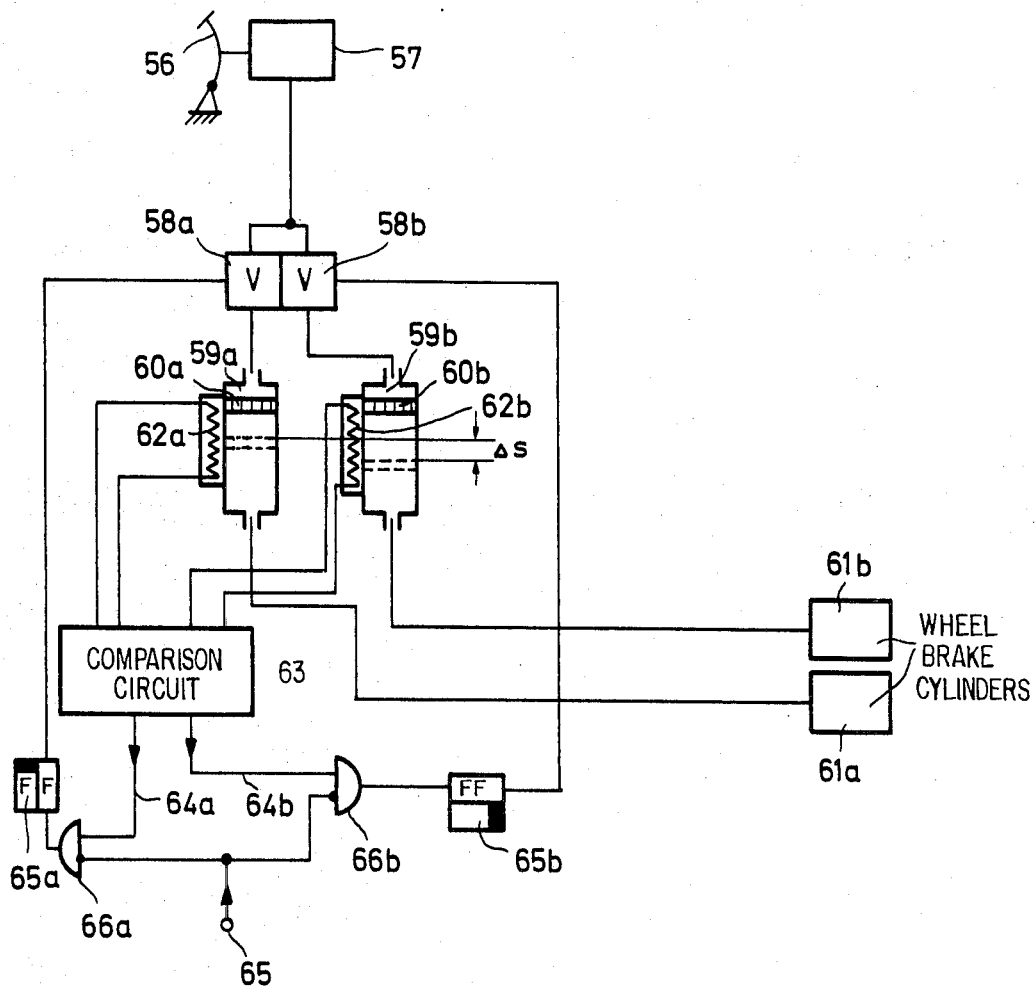
FIG. 3 is a simplified hydraulic-electric circuit diagram of a brake system illustrating a modified arrangement of a volume monitor and the control arrangement thereof.

FIG. 3 shows an embodiment in which the volume monitor or leak sensing is realized in a different manner. In this embodiment it is not the absolute value of the pressure medium flowing through the line but the different displacement of two pistons at the occurrence of a leak which is determined. For reasons of simplicity only two brake lines for two brakes are shown. However, this principle can also be used for more brakes and for two brake circuits, the comparison being preferably made between the front and rear wheel brakes, i.e. between brakes having different thermal stresses.

In FIG. 3 the brake pedal is marked 56 and the master brake cylinder 57. The brake line coming from this master brake cylinder 57 branches off and leads through the normally open shutoff valves 58a and 58b and the respective cylinder-piston arrangements 59a/60a or 59b/60b to the brake cylinders 61a and 61b respectively. With the exception of the electrical signal generating portions, the cylinder-piston arrangements 59/60 substantially correspond, in their mechanical construction, to the arrangement of FIG. 2. During braking operations in which no leak occurs, pistons 60a and 60b are displaced to the same extent. The displacement of pistons 60a and 60b is noted by sensor members 62a and 62b respectively, which may, for example, be resistors whose resistance values change with the displacement of the associated pistons. The change in the respective resistance values is detected by an electrical or electronic mechanism 63, which may be, for example, a bridge arrangement. The electronic mechanism 63 emits a blocking signal for one of valves 58a or 58b through one of lines 64a and 64b respectively only when a difference in position ΔS is produced for the pistons during braking which difference exceeds a predetermined given value. This difference in position ΔS can only be caused by a leak under normal braking conditions, i.e., under conditions when the anti-locking controller of the brake system is not functioning. In the case shown in dashed lines, piston 60b has advanced further than piston 60a indicating that a leak has occurred in the brake channel of brake cylinder 61b. The increased advance of the piston 60b results in the mechanism 63 causing a blocking signal to appear on line 64b which flips flipflop member 65b. The output signal of this flipflop member 65b causes the valve arrangement 58b to close, thus blocking the pressure medium channel leading to brake cylinder 61b. Correspondingly, the channel leading to brake 61a is blocked when piston 60a advances. As with the embodiment of FIG. 1, the flipflops 65a and 65b are returned to their rest positions by a signal applied to the other inputs thereof when, e.g. the ignition switch is opened.

In a known anti-locking controller for wheel brakes which permits a portion of the pressure medium to flow into a return line during the control action after the pressure medium channel has been blocked so that the pressure is reduced between the shut-off valve and the wheel brake cylinder, i.e. a system which operates with a normally open inlet valve and a normally closed outlet valve or with a three-way valve (in contradistinction to the also known pressure modulator), it is possible for a difference in the position of the two pistons 60a and 60b to also occur during the control process. Care must therefore be taken to prevent this difference in position from being sensed as a leak. Accordingly, for this reason AND gates 66a and 66b are inserted in signal lines 64a and 64b respectively which receive a signal via terminal 65 when an anti-locking control signal for the associated wheel brake appears, i.e. when the pressure applied to the brake is being regulated to prevent locking of the associated wheel. Since the corresponding inputs of AND gates 66a and 66b to which the terminal 65 is connected are negated, the AND gates are blocked when the anti-locking control is effective so that during this time a signal from electronic mechanism 63 cannot cause valves 58a and 58b to close.

Figure 4A:
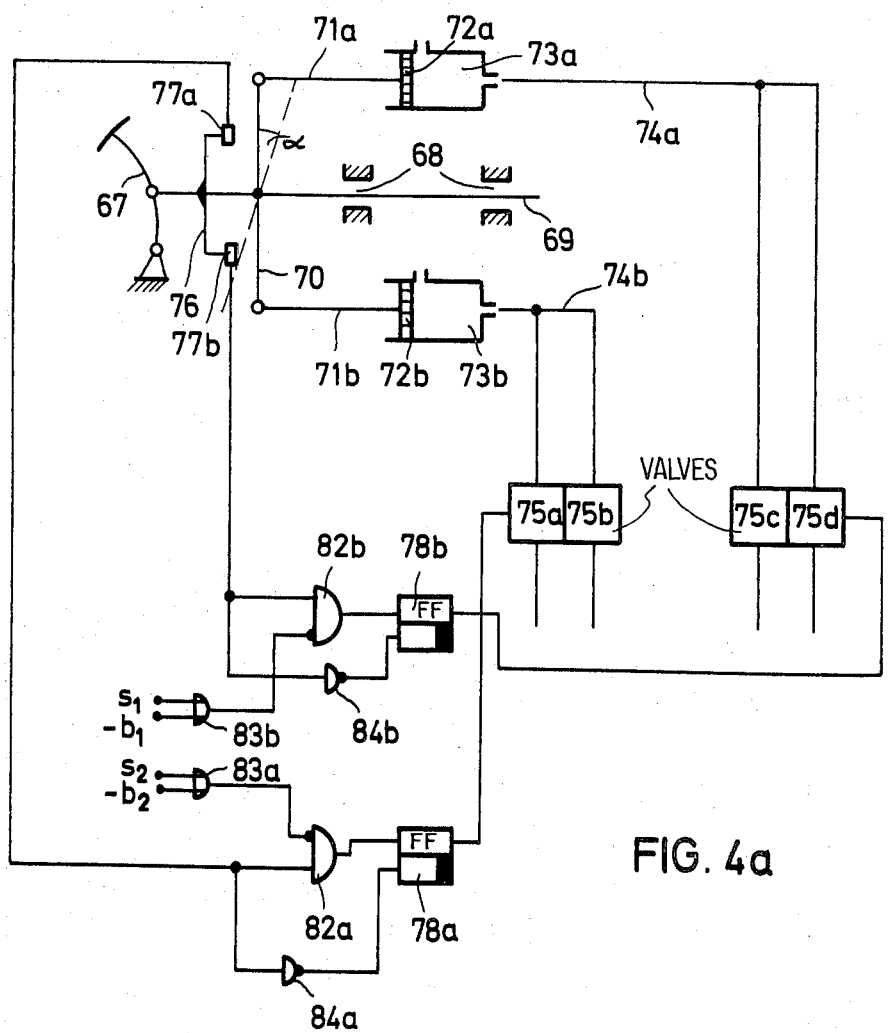
FIG. 4a is a simplified hydraulic-electric circuit diagram illustrating a possible configuration of the brake system according to the present invention in a dual circuit brake system.

FIG. 4a shows a further embodiment of the present invention as it may be used with dual circuit brakes. In this embodiment it is assumed that each wheel is controlled individually.

In this embodiment the brake pedal 67 is connected via a pivot joint to a rod 69 which is guided at points 68 for axial movement. A swingletree 70 is connected to the rod 69 via a further pivot joint, and the actuating rods 71a and 71b for pistons 72a and 72b of a twin master brake cylinder are connected, again via pivot joints, to the ends of the equally long arms of the swingletree 70. The twin master brake cylinder in this embodiment is a master brake cylinder having two parallel cylinders 73a and 73b, one for each of the two brake circuits. Upon actuation of pedal 67, the same braking pressures are normally produced in the two brake lines 74a and 74b. Brake lines 74a and 74b branch off and lead, via the four valve arrangements 75a – 75d, to the four wheel brakes (not shown). If a leak occurs in one of the brake circuits, e.g. in the lines leading from valves 75c or 75d to the associated wheel brake cylinders or in the brake cylinder itself, the swingletree 70 is rotated during braking by the angle α. Thus, beginning with a certain degree of rotation, the swingletree 70 comes in contact, in the illustrated example, with the switch 77b which is rigidly mounted on rod 69 by means of a mount 76 which also supports the switch 77a. The contacting of the switch 77b by the swingletree 70 actuates an electrical contact therein to close and produce a switching signal for flipflop member 78b causing it to flip and produce an output signal which closes or locks the shutoff valves of the valve arrangements 75c and 75d. Thus the pedal pressure acts only on the second brake circuit which is still functional, i.e. the circuit containing valve arrrangements 75a and 75b and prevents the pedal from falling down. Similarly, upon a leak in the other brake circuit, switch 77a and flipflop 78a are actuated to close valves 75a and 75b.

In the above-described embodiment, falling down of the pedal is prevented by cutting off one entire brake circuit when a leak occurs. According to a further embodiment of the presnt invention, it is also possible to detect the leak and to interrupt only the respective line.

Figure 4B:
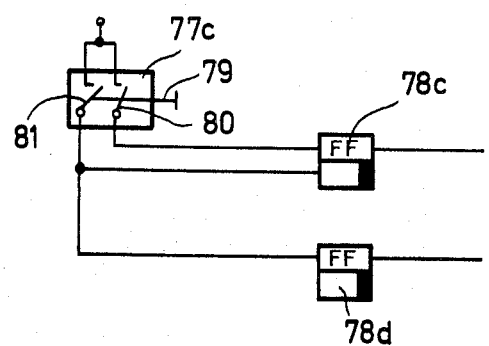

For this purpose each of switches 77a and 77b are designed as shown by the switch 77c in FIG. 4b. Switch 77c comprises a plunger 79 which controls two switch contacts 80 and 81. The switch contacts 80 and 81 are arranged so that upon axial movement of the plunger 79 first one contact, e.g. contact 80, is closed and the contact 81 is only closed after further movement of the plunger 79.

In operation, when the swingletree 70 is rotated as a result of a leak in one of the brake lines, it displaces plunger 79 so that initially the first switch 80 is closed which then causes flipflop 78c to flip and close, for example, shutoff valve 75c. If the leak is disposed in the associated pressure medium channel, no further rotation of the swingletree 75 occurs, the line leading through valve 75c remains closed and braking occurs at the other three brakes of the vehicle. However, if the leak is in the other channel of the brake circuit, i.e. the channel containing valve 75d, the swingletree 70 continues to rotate and move plunger 79 until finally contact 81 is closed. Closure of contact 81 causes flipflop member 78d to be flipped, causing valve 75d to be closed, and flipflop member 78c to be flipped back to its rest position, causing valve 75c to open again. A switching arrangement according to FIG. 4b replaces each of the switches 77a and 77b so that all of the valves can be closed separately when a leak is detected.

The above described principle of the twin master brake cylinder with integrated volume monitor of FIGS. 4a and 4b is not limited to a brake system with individually controlled wheels but can also be used where two control valves are disposed in one brake circuit, and only one control valve is disposed in the other brake circuit, i.e. where two wheels are controlled together. In this case only one of the switches on the mount 76 need be designed as shown in FIG. 4b while the other can be a simple switch as shown in FIG. 4a.

In order to ensure that the leak detector control is only effective when the anti-locking control for the wheel brakes is not in effect, as shown in FIG. 4a, the signals of switches 77a and 77b are fed to the flipflops 78a and 78b via AND gates 82a and 82b respectively. As in FIG. 3, the signals from switches 77a and 77b are suppressed when a slip signal $S_1$ or $S_2$ and/or a deceleration signal $-b_1$ or $-b_2$, respectively, appears at the associated wheels to indicate a tendency for locking. The suppression is accomplished by feeding these signals to OR gates 83a and 83b whose outputs are fed to negated inputs of the AND gates 82a and 82b respectively. A return flip of the flipflops can here be effected by opening switch 77a or 77b, respectively. inverters 84a and 84b being provided for this purpose. The return flip upon opening of the switch can be suppressed when a sufficient quantity of reserve fluid is no longer available.

Figure 5:
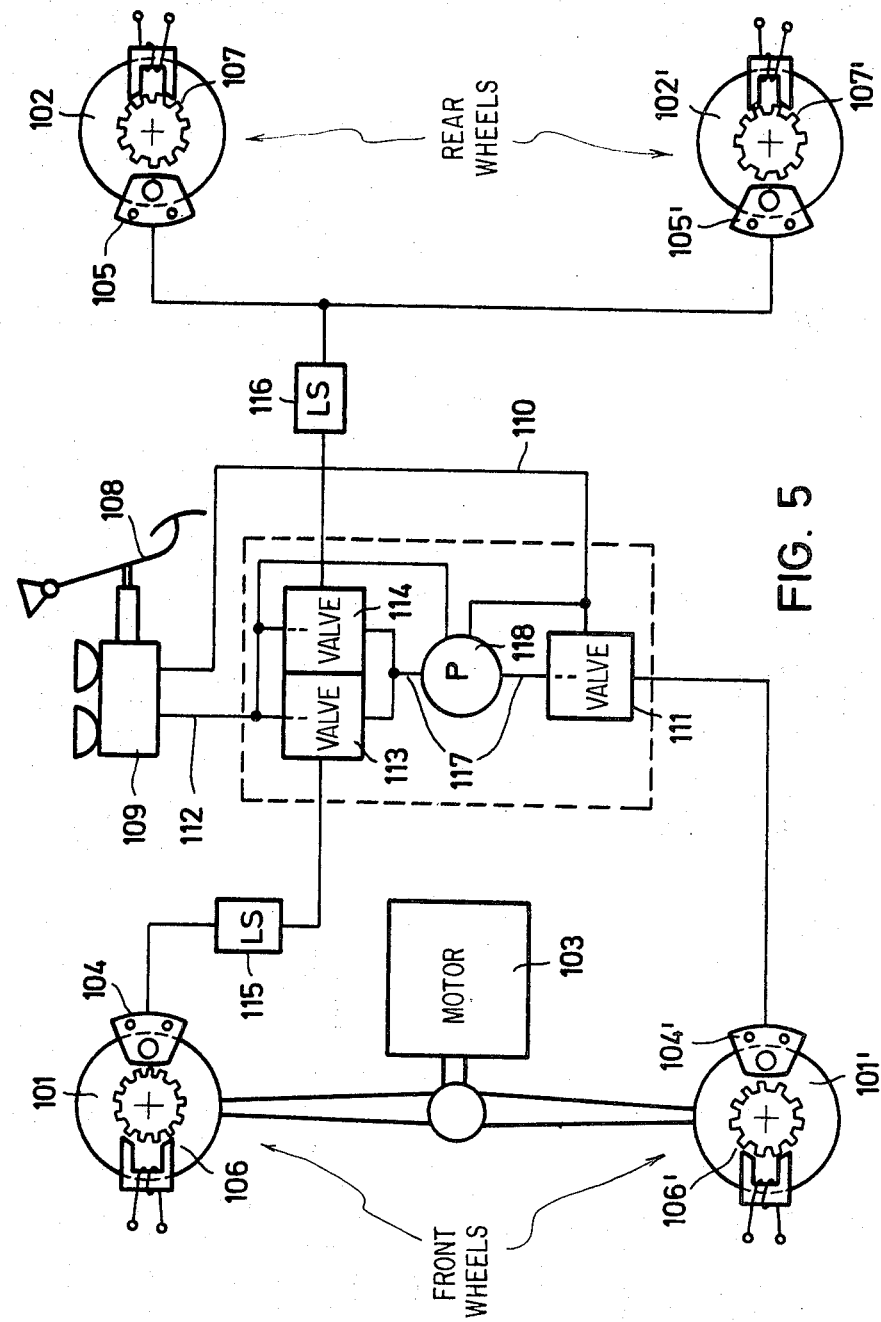
FIG. 5 is a simplified block diagram illustrating an embodiment of the invention with a preferred distribution of the brake circuits as well as a combined control of the rear wheel brakes.

Turning now to FIG. 5 there is shown a basic diagram for a dual circuit brake control system having an improved type of brake circuit distribution and incorporating leak sensing arrangements as described above. In FIG. 5 the two front wheels of the vehicle are marked 101 and 101' and the two rear wheels 102 and 102'. The illustrated vehicle is drive by motor 103 through the front wheels. Each wheel has an associated brake 104, 104' (front) and 105, 105' (rear) and is provided with a sensor 106, 106' or 107, 107', respectively, to produce a pulse train whose pulse frequency is proportional to the rotational speed of the wheel. Brake pedal 108 serves to actuate the brakes in that it actuates the two pistons for the two brake circuits in the dual master brake cylinder 109. The brake line 110 connected to one cylinder leads through the normally open valve arrangement 111 to brake 104' of wheel 101'. The brake line 112 connected to the other cylinder of the master brake cylinder 109 is divided and leads through the also normally open valve arrangement 113 to the wheel brake 104' and through the open valve arrangement 114 to the wheel brakes 105 and 105' of the rear wheels. To improve the braking behavior leak sensors 115 and 116 (e.g. as shown in FIG. 2) are built into the brake line leading to the wheel 101 and in the common brake line leading to the rear wheels, respectively, which leak sensors generate an electrical signal when a certain amount of pressure medium has flown through due to a leak in the associated line. The electrical signals from the leak sensors 115 and 116 are used to actuate the valve arrangements 113 or 114, respectively, in such a manner that further pressure medium outflow is prevented as explained above with respect to FIGS. 1–4. If the valve arrangements 113 and 114 each consists of an inlet and an outlet valve, only the inlet valve is closed by the signals from the leak sensors. If the valve arrangements consist of a three-way valve, its actuation prevents the further inflow of pressure medium. Although not illustrated, it is to be understood that if desired, a further leak detector arrangement for controlling valve arrangement 111 may be incorporated in the brake line leading to wheel 101'.

The valve arrangements 111, 113 and 114 are actuated by control signals derived from the values obtained at the wheels in such a manner that the braking pressure at the wheel brakes is alternatingly kept constant and/or reduced and built up again during the antilocking control process. The pressure medium escaping from the brakes during the reduction of the pressure is fed through lines 117 to a return pump 118 which separately (two pump chambers) returns the pressure medium coming from the two circuits to the individual brake circuits.

In the arrangement according to the present invention described in connection with FIG. 5, a high residual braking action remains when one of the brake circuits malfunctions although only two additional leak sensors are required. Moreover, one control channel is here eliminated, i.e. both rear wheels are simultaneously controlled. A twin master brake cylinder as shown in FIGS. 4a and 4b can here be used as the leak sensor, the circuit containing the two valves then having a switch according to FIG. 4b associated to it to prevent a drop in pressure upon the occurence of a leak in the lines leading to any of the wheels 101, 102 or 102'. Although as illustrated no leak sensor control is required for the other circuit with the circuit distribution of FIG. 5, if desired such can easily be achieved when using a twin master brake cylinder as shown in FIGS. 4a and 4b by adding a simple switch, such as switch 77a of FIG. 4a, to the other end of mount 46 which controls the closing of valve arrangement 111. This prevents falling down of the pedal 108, when a leak occurs in this brake circuit.

Figure 6:
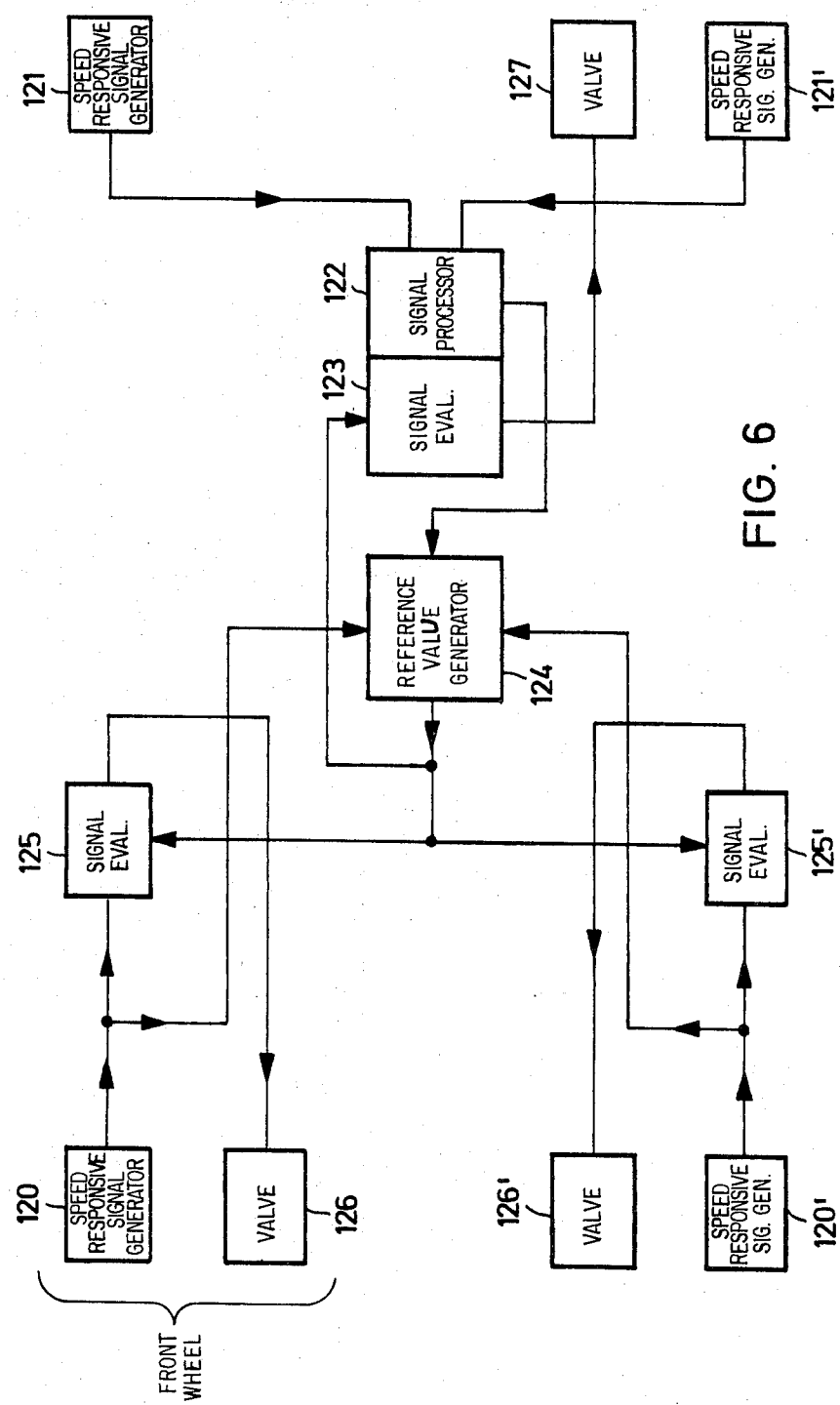
FIG. 6 is a block diagram illustrating one arrangement for controlling the valves in the embodiment according to FIG. 5.

FIG. 6 illustrates in a generalized form the block circuit diagramm of a control circuit for controlling the valves of the embodiment of FIG. 5 to prevent locking of the wheels during a braking action. Each of the two front wheels is provided with a voltage generator 120 or 120' which produce a voltage which is proportional to rotational speed of the individual wheel. The corresponding members for the rear wheels bear reference numerals 121 and 121'. The voltages at the outputs of members 121 and 121' are fed to a signal processing member 122, in which, for example upon the occurrence of a certain minimum deceleration, the higher voltage is fed to the signal evaluation 123 as well as to circuit 124 to form a reference value. This circuit 124 also receives the voltages from voltage generators 120 and 120' and the reference value which is formed from the three values fed in, is then fed to the signal evaluators 125, 125' and 123. Each of the signal evaluation circuits compares the input voltage thereto which depends on the rotational speed of the associated wheel or wheels with the reference value and produces in a known manner the control signals for the associated valve arrangements 126 and 126' of the front wheel brakes or for the associated valve arragement 124 of the rear wheel brakes. The contents of the various blocks of FIG. 6 are known, for example, from U.S. Pat. No. 3,494,671, where speed responsive voltage generators, differentiators for these voltages to obtain a deceleration signal, comparators, and select-circuitry are described in detail. Also examples for producing a reference signal, using one or two generator signals, are here described. Instead of producing the reference signal by selecting one voltage it is also possible and known (German Patent No. 952,270) to produce an average value from the several speed signals and to use this value as reference signal.

Figure 7:
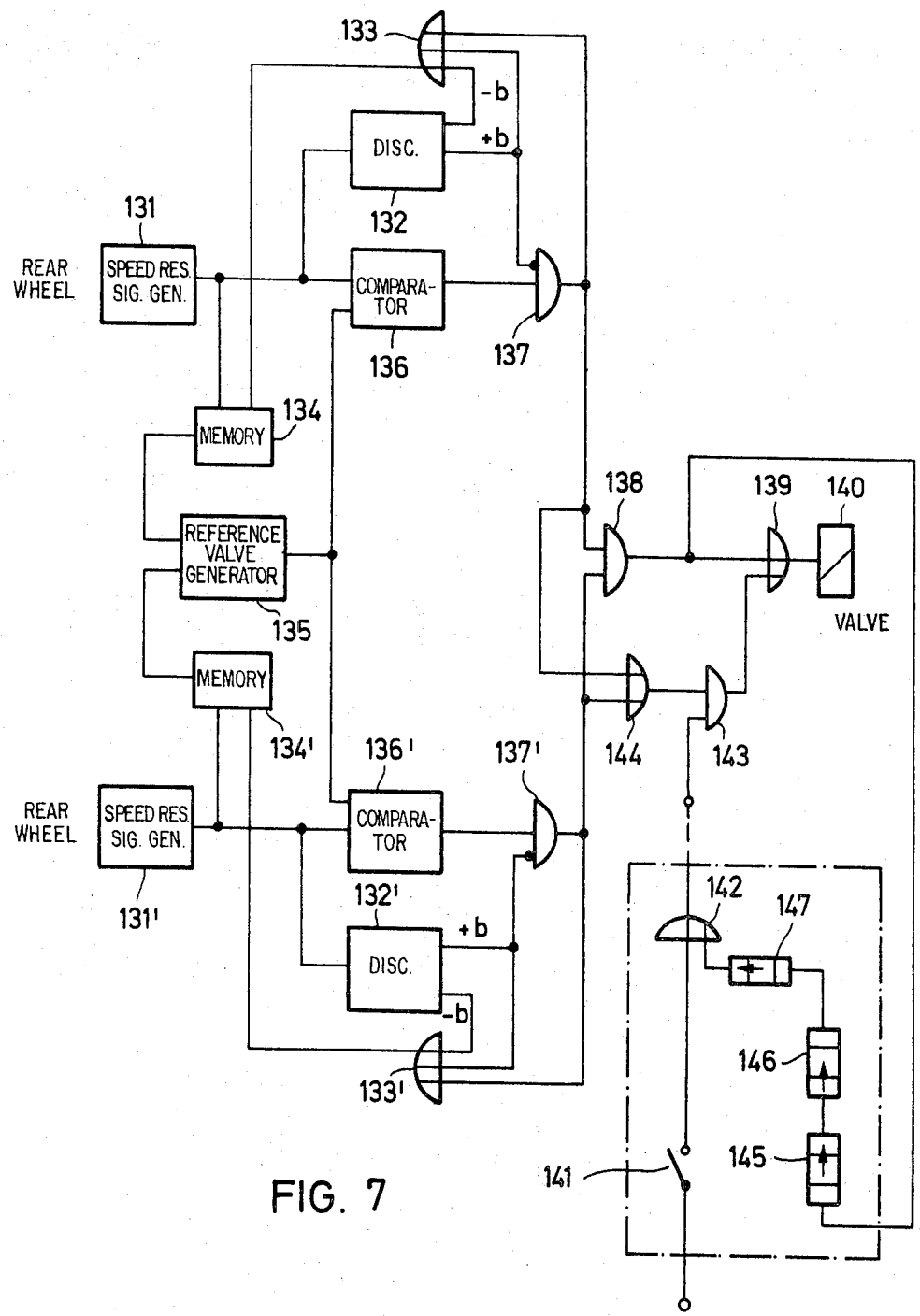
FIG. 7 is a block diagram illustrating an alternate embodiment with optimum control of the brakes of the rear axles for the brake circuit distribution of FIG. 5.

FIG. 7 shows a somewhat more specialized embodiment for the control of the rear wheels. In this embodiment a switch occurs between two types of control and the reference value for the rear wheels is derived only from the rear wheel speeds.

FIG. 7 blocks 131 and 131' represent circuits which generate voltages which are proportional to the rotational speeds of the two rear axle wheels of a vehicle with front wheel drive. The generation of these voltages is known and need not be ex-plained in detail. These voltages are fed to differentiating circuits 132 and 132' which emit voltages in their output lines when the rotational speeds increase (+b) or decrease (−b) faster than a given value. These signals are fed to respective memory circuits 134 and 134' via OR gates 133 and 133' respectively and there cause the output voltages from voltage generating circuits 131 and 131' which are also fed to memories 134 and 134' to be stored. The value stored is thus proportional to the momentary speed of the wheel. In reference value circuit 135, the larger of the stored values in memories 134 and 134' is selected and fed to comparators 136 and 136'. There the reference value is compared with the voltages corresponding to the momentary wheel speeds. If the value corresponding to the rotational speed of the wheel differs from the reference value by at least a given amount, a voltage appears at the output of each of the comparison members 136 or 136', which voltages are fed via AND gates 137 or 137', respectively, to the inputs of AND gate 138 as long as no signal +b appears at the outputs of discriminators 132 or 132', respectively (due to the negated second input of AND gates 137 and 137'). If both AND gates 137 and 137' feed a voltage signal to AND gate 138, a voltage passes through OR gate 139 to the three-way valve 140 which is then switched and reduces in a known manner the previously increasing brake pressure by permitting pressure medium to escape into a return line. The voltage at the output of the AND gate 137 or 137' is also fed via OR gate 133 or 133' respectively to memory 134 or 134', respectively and there effects a renewed storing of a signal corresponding to the momentary rotational speed of the wheel every time it appears. The AND gates 137 and 137' with their one negated input have the effect of blocking or preventing further transmittal of those voltages which represent deviations from the reference voltage, as determined in comparison circuits 136 and 136', and which correspond to accelerations of the wheel.

The actuation of valve 140 is effected in the previously described circuit components when the antilocking brake control process is initiated by a −b signal at the output of one of the discriminators 132 and 132', i.e. when a value is stored which corresponds to the momentary rotational speed of a wheel and when the voltages corresponding to the rotational speeds of both wheels differ from the reference value formed in 135 by at least a given amount (select high).

According to a further feature of the present invention, a transverse acceleration switch 141 is also provided which closes as long as at least a given transverse acceleration (e.g. 0.2g) is being exceeded and then applies a voltage to AND gate 143 via OR gate 142. For example, a mercury-switch available on the market can be used as transverse acceleration switch 141.

As long as the transverse acceleration switch 141 is closed, a voltage will reach OR GATE 139 via OR gate 142 and AND gate 143 as soon as at least one of AND gates 137 and 137' emits a voltage, since the outputs of these AND gates 137 and 137' are coupled to AND gate 143 via OR gate 144. Thus in this operational state every one of the signals at the output of AND gates 137 and 137' can actuate the valve 140 (select low). When driving through a curve this operational state is in effect. Instead of a transverse acceleration switch it is also possible to utilize a certain degree of turn in the steering wheel as the switching criterion.

The output signal from AND gate 138 which appears during straight-ahead driving when both wheels tend to block is also fed to the series connected time members 145 to 147. These time members have the effect that when the output signal from AND gate 138 continues beyond a given period of time (e.g. 1.5 sec) (member 146), a voltage is applied to OR gate 142 for a certain time beyond the end of the output voltage at member 138 which voltage has the same effect as the closed transverse acceleration switch 141, i.e. initiates select-low operation. Member 145 bridges very short-time interruptions at the output of AND gate 138. Such a case occurs during emergency stops from high speeds. It may happen here that, for example, one wheel locks and the other wheel shows a locking tendency over a certain period of time. In this state the brake pressure is reduced and finally the one wheel will again exhibit a permissible slip. Then, in spite of further locking of the other wheel, the brake pressure would be built up again. However, if the signal at the output of AND gate 138 has continued for the given period of time, a further pressure reduction is effected by members 145 to 147 for a given time. The fact that the voltage at the output of AND gate 138 has continued for the given period of time is a criterion for the fact that continued braking took place, for example, from a high speed, where locking of the one wheel over the entire time period is not desired.

The time members 145 and 147 prolong the pulses fed to them for a short time. Thus the time member 145 prevents that a very short interruption of the output of gate 138 interrups the timing of the member 146, while the time member 147 effects that the valve 140 is actuated a short time longer than the output of member 146 lasts. The time member 146 gives an output only if the input signal continues beyond a given period (e.g. 1.5 sec.) and provides no more output, when its input signal ceases. Thus this time member causes, together with member 147, that the brake pressure is reduced for a short time longer, than the output of gate 138 lasts, if the output of gate 138 has lasted for at least the given time period (1.5 sec.).

The contents of the various blocks of FIG. 7 are known, for example, from U.S. Pat. No. 3,494,671 where speed responsive signal generators, discriminators, comparators, memories and select circuitry are described.

It will be understood that the above description of the present invention is susceptible to various modifications, changes and adaptations, and the same are intended to be comprehended within the meaning and range of equivalents of the appended claims.

I claim:

1. In a hydraulic brake system for a vehicle, said brake system including an anti-locking control system for controlling the pressure applied to the vehicle wheels to prevent locking thereof, said anti-locking control system being of the type wherein shutoff valves are connected in the brake lines connecting the pressure source to the wheel brake cylinders, the improvement comprising:
    at least one volume monitoring means connected in said hydraulic brake system for detecting the volume of the pressure medium flowing from the pressure source to the wheel brake cylinder and for emitting an electrical signal when a predetermined threshold volume of said pressure medium has been exceeded, indicating that a leak exists in the associated brake channel;
    circuit means responsive to said electrical signal for closing the shutoff valve associated with the brake line being monitored by said volume monitoring means, said circuit means including a memory means for storing said electrical signal until the current supply thereto is shut off; and
    means for providing a warning indication connected to the output of said memory means and responsive to said electrical signal, whereby said warning indication is also maintained until said current supply is shut off.

2. A hydraulic brake system as defined in claim 1 wherein said anti-locking control system for preventing locking of the vehicle wheels is the type which provides a pressure reduction at a particular wheel cylinder upon the detection of a locking condition by permitting a volume of pressure medium to flow into a return line to the pressure source; and
    wherein said circuit means includes logic circuit means for permitting said electrical signal to close said shutoff valve only when said anti-locking control system is not functioning to control the braking action.

3. A hydraulic brake system as defined in claim 1 wherein said volume monitoring means comprises:
    a cylinder having a piston mounted therein, said piston dividing the interior of said cylinder into two chambers, one end of said cylinder, and hence one of said chambers, being connected to the outlet of the associated shutoff valve and the other end of said cylinder, and hence the other of said chambers, being connected to the brake line leading to the associated wheel cylinder;
    an electrical switch mounted adjacent said cylinder at a position along its length corresponding to said predetermined threshold volume; and
    means on said piston for actuating said electrical switch when said piston has traveled in said cylinder to a position adjacent said electrical switch.

4. A hydraulic brake system as defined in claim 3 wherein:
    said piston includes a pair of longitudinal channels which connect said two chambers, one of said channels including a check valve which opens in the direction from the wheel brake cylinder to the shutoff valve, the other of said channels containing a fine nozzle; and
    a spring mounted within said cylinder for normally urging said piston against the end of said cylinder connected to the output of said shutoff valve.

5. A hydraulic brake system as defined in claim 3 wherein said means on said piston for actuating said electrical switch comprises a permanent magnet; and wherein said electrical switch comprises a magnetic field sensitive switch which is arranged adjacent said cylinder so that it is actuated by the magnetic field of said magnet when said piston is adjacent thereto.

6. A hydraulic brake system as defined in claim 3 wherein the inner wall of said cylinder is provided with a longitudinal channel which is so arranged and dimensioned that a connection is produced between said two chambers which bypasses said piston when said piston is adjacent the end of said cylinder connected to the brake line leading to the wheel cylinder.

7. A hydraulic brake system as defined in claim 1 wherein said volume monitoring means comprises:
    at least two cylinders each having a movable piston mounted therein which divides the interior of the respective cylinder into two chambers, each of said cylinders being connected in the brake line leading to a different wheel cylinder, with one end thereof, and hence one of said chambers, being connected to the outlet of the shutoff valve for the associated brake line and the other end thereof, and hence the other of said chambers, being connected to the inlet of the associated brake cylinder;
    means for detecting the position of each of said pistons;
    a separate output line associated with each of said pistons; and
    means for comparing the positions of said pistons and for generating said electrical signal on the one of said output lines associated with the leading piston whenever the difference between the positions of the pistons reaches a predetermined value; and
    wherein said circuit means is responsive to said electrical signal to close the shutoff valve associated with said leading piston.

8. A hydraulic brake system as defined in claim 7 wherein:

each of said pistons includes a pair of longitudinal channels which connect said two chambers, one of said channels including a check valve which opens in the direction from the wheel brake cylinder to the shutoff valve, the other of said channels containing a fine nozzle; and a spring is mounted within each of said cylinder for normally urging the associated said piston against the end of said cylinder connected to the output of said shutoff valve.

9. A hydraulic brake system as defined in claim 7 wherein said means for detecting the position of each of said pistons comprises a resistor whose resistance value varies with the position of the associated piston within the cylinder; and wherein said comparing and generating means includes a bridge circuit having said resistors connected in different arms thereof.

10. A hydraulic brake system as defined in claim 7 wherein said anti-locking control system for preventing locking of the vehicle wheels is the type which provides a pressure reduction at a particular wheel cylinder upon the detection of a locking condition by permitting a volume of pressure medium to flow into a return line to the pressure source; and wherein said circuit means includes logic circuit means for permitting said electrical signal to close said shutoff valve only when said anti-locking control system is not functioning to control the braking action.

11. A hydraulic brake system as defined in claim 1 wherein said brake system is a dual circuit brake system.

12. A hydraulic brake system as defined in claim 11 wherein:

wheel cylinders of two wheels are included in each circuit;

each wheel cylinder is separately controlled by said anti-locking control system by means of a separate normally open inlet or shutoff valve connected in the associated brake line and a normally closed outlet valve connected to the brake line at the outlet of the inlet valve; and wherein one of said volume monitoring means is connected in each of said brake lines.

13. A hydraulic brake system as defined in claim 11 wherein said pressure source for said brake system is a dual circuit master cylinder having two parallel cylinders each containing a piston; wherein said volume monitoring means comprising: an axially movable rod connected to the brake pedal of said vehicle; a swingletree mounted on said rod with the actuating arm for each of said pistons being connected to the end of a different one of the arms of said swingletree; electrical switch means rigidly mounted on said rod and positioned to respond to and produce said electrical signal upon a given rotational displacement of an end of said swingletree; and wherein said circuit means is responsive to said electrical signal to close at least one of the shutoff valves incorporated in the respective brake circuit.

14. A hydraulic brake system as defined in claim 13 wherein said switch means includes a pair of electrical switches, one positioned adjacent each end of said swingletree.

15. A hydraulic brake system as defined in claim 14 wherein said circuit means is responsive to the output signal from one of said electrical switches to close all of the shutoff valves incorporated in the brake lines of the associated brake circuit.

16. A hydraulic brake system as defined in claim 13 wherein at least one brake circuit includes a plurality of shutoff valves each connected in the brake line to a different wheel cylinder; wherein said switch means associated with said at least one brake circuit produces an electrical output signal related to the degree of angular displacement of the arms of said swingletree; and wherein said circuit means includes means responsive to said electrical output signal for closing the shutoff valves associated with said at least one brake circuit in succession, with only one shutoff valve being closed at any one time, until no further displacement of said swingletree occurs 17. A hydraulic brake system as defined in claim 16 wherein said switch means produces a first electrical output signal when said swingletree is displaced by a first angular value and a second electrical output signal when said swingletree is displaced by a second further angular value; and wherein said circuit means is responsive to said first electrical output signal to close a first of the shutoff valves associated with said at least one brake circuit, and is responsive to said second electrical output signal to close a second of the shutoff valves associated with said at least one brake circuit and to open said first of the shutoff valves.

18. A hydraulic brake system as defined in claim 11 wherein one brake circuit of said dual circuit brake system includes only the brake of one front wheel and the second brake circuit includes the brakes of the remaining wheels; and wherein said volume monitoring means and a shutoff valve are connected in at least one of the pressure medium lines of one of said circuits.

19. A hydraulic brake system as defined in claim 18 wherein said volume monitoring means and the associated shutoff valve controlled thereby are disposed in the pressure medium line leading to the front wheel which is included in the brake circuit including the two rear wheels.

20. A hydraulic brake system as defined in claim 18 wherein said anti-locking control system separately controls the brake pressure at each of the rear wheels; and wherein a volume monitoring means is connected in at least one pressure medium channel leading to the rear wheel brakes, said volume monitoring means controlling the shutoff valve disposed in said at least one channel.

21. A hydraulic brake system as defined in claim 18 wherein said anti-locking control system provides a combined control of the brake pressure at the rear wheels.

22. A hydraulic brake system as defined in claim 21 wherein said volume monitoring means is connected in the common pressure medium channel leading to the rear wheel brakes, said monitor controlling the shutoff valve disposed in said common channel.

23. A hydraulic pressure system as defined in claim 22 wherein said anti-locking control system controls the brake pressure by means of a normally open inlet valve and a normally closed outlet valve per controlled channel, and wherein said volume monitoring means controls said inlet valve as the shutoff valve.

24. A hydraulic brake system as defined in claim 22 wherein said anti-locking control system controls the brake pressure by means of a three-way valve connected in the channel to be controlled; and wherein said volume monitoring means controls said three-way valve to block the channel.

25. A hydraulic brake system as defined in claim 21 wherein said anti-locking control system controls said jointly controlled rear wheels based on the acceleration and/or rotational wheel speed signals derived from said wheels.

26. A hydraulic brake system as defined in claim 25 wherein for a joint control of the brake pressure at the rear wheels said anti-locking control system includes means for controlling the rear wheel brakes to prevent locking in accordance with the rotational behavior of the faster rotating wheel (select high).

27. A hydraulic brake system as defined in claim 25 wherein for a joint control of the brake pressure at the rear wheels, said anti-locking control system includes means for controlling the rear wheel brakes to prevent locking in accordance with the rotational behavior of the slower rotating wheel (select low).

28. A hydraulic brake system as defined in claim 26 wherein said means for controlling the rear wheels normally controls same in accordance with the rotational behavior of the faster rotating wheel; wherein means are provided for detecting the transverse acceleration of the vehicle, and wherein said means for controlling further includes means responsive to the occurence of a given transverse acceleration for switching the control to a state in which it controls the rear wheels in accordance with the rotational behavior of the slower rotating wheel.

29. A hydraulic brake system as defined in claim 25 wherein said anti-locking control system includes means for forming a reference value from the signals derived from the rear wheels, and for using said reference value to control the brake pressure at the front wheels of said vehicle.

30. A hydraulic brake system as defined in claim 25 wherein said anti-locking control system includes means for forming a reference value from the signals derived from the rear wheels and from the front wheels and for using said reference value to control the brake pressure at the front wheels of said vehicle.

* * * * *